E. F. COLLINS.
MELTING FURNACE.
APPLICATION FILED JAN. 10, 1920.

1,378,526.

Patented May 17, 1921.

Inventor:
Edgar F. Collins,
by
His Attorney.

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

MELTING-FURNACE.

1,378,526.     Specification of Letters Patent.     Patented May 17, 1921.

Application filed January 10, 1920. Serial No. 350,487.

*To all whom it may concern:*

Be it known that I, EDGAR F. COLLINS, a citizen of the United States, residing at Schenectady, in the county of Schenectady, State of New York, have invented certain new and useful Improvements in Melting-Furnaces, of which the following is a specification.

The present invention comprises an electric furnace which is particularly well adapted for the melting of easily fusible metals, such, for example, as zinc.

One of the objects of my invention is to provide a furnace in which metal bodies to be melted are subjected to the washing action of metal already molten; another object of my invention is to provide means for separating dross from the molten metal.

As will be hereinafter more fully described, my improved furnace comprises a plurality of chambers connected to each other by submerged passages, the metal to be melted being charged into one of said chambers and the clean molten metal being removed from another chamber. The heat required to melt the metal preferably is furnished by an electric heater located in a connecting chamber.

Figure 1:
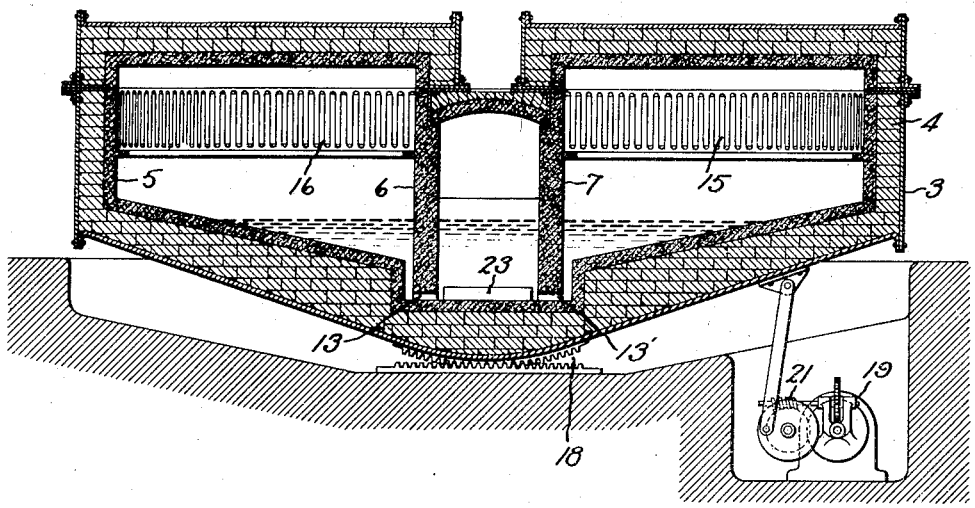
Figure 2:
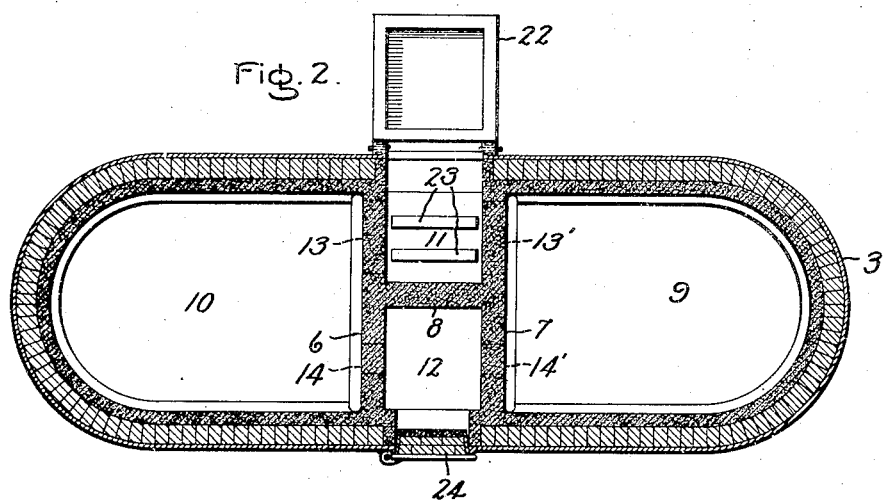

In the accompanying drawing, Figure 1 is a sectional elevation, Fig. 2 is a horizontal section of a furnace embodying my invention.

Referring to Fig. 1, the furnace comprises a container consisting of an outer metal shell 3, a wall of heat-insulating brick 4, and a lining 5 of suitable furnace lining. The vertical walls 6, 7 and 8, subdivide the furnace into several compartments, namely, two heating chambers 9 and 10, a charging chamber 11, and a discharging chamber 12 from which clean molten metal may be removed. The chambers 11 and 12 are connected respectively by passages 13, 13', and 14 and 14', with the heating chambers 9 and 10, the connecting passages being located near the bottom so as to be submerged beneath the surface of a molten charge in the furnace.

Heat is imparted to the charge by resistance heaters 15, 16, in the chambers 9 and 10, respectively. These heaters may consist conveniently of ribbons of suitable refractory metal looped back and forth on insulating supports.

The furnace is rocked upon a cog mechanism 18 by a motor 19 connected to the furnace by suitable gearing 21. The rocking motion causes melted metal to flow back and forth between the heating chambers 9 and 10 through the charging chamber 11, thereby subjecting solid masses of metal in the charging chamber to a washing action with the hot molten metal. This washing action is more efficient than radiant heat to melt solid masses of metal. Scum and dross are retained within the charging chamber as the communicating passages are located beneath the surface of the charge.

Metal to be melted, for example, plates of electrolytic zinc, may be stacked edgewise on the door 22 when this door is in a horizontal position. By raising this door to a vertical position, the plates may be charged into the melting chamber 11 and the door to this chamber may then be closed. The plates to be melted are supported edgewise on the raised blocks 23 at the bottom of the furnace. The plates are subjected edgewise to the washing action of the already molten metal as the furnace rocks back and forth, the weight of the plates keeping the same immersed.

Clean molten metal may be removed from the chamber 12 through a door 24.

What I claim as new and desire to secure by Letters Patent of the United States, is:—

1. An electric furnace comprising a chamber adapted to contain a pool of molten material, electric heating means in said chamber, a second chamber adapted to receive charges of unfused material, said chambers being connected by a conduit and means for causing currents of molten material to be interchanged through said conduit between said chambers thereby subjecting unfused material to the washing action of molten material while retaining solid impurities in the second chamber.

2. An electric furnace comprising a plurality of inclosed heating chambers, means for electrically developing heat in said chambers, a plurality of chambers located between said heating chambers, conduits connecting said chambers near the base thereof, and means for rocking said furnace to produce an interchange of charge in said chambers.

3. A furnace comprising a melting chamber, means for supplying heat to said chamber, means for moving a molten charge in said furnace, means for holding material to be melted in position to be washed by said charge, and means for segregating dross on said molten charge.

4. A furnace comprising a container subdivided into charging, melting and discharging compartments, an electric heater in said melting compartment, passages adapted to be submerged by a molten charge connecting said compartments, and means for rocking said furnace to cause an interchange of molten material by said compartments.

5. An electric furnace comprising an inclosed chamber, means for subjecting material therein to radiant heat, a second chamber having a charging door and communicating with said heating chamber by a conduit adapted to be submerged within a molten charge, and means for causing currents of fused charge to flow alternately from one of said chambers to another.

6. An electric furnace comprising an inclosed chamber, a resistance heater mounted therein in position to radiate heat to a charge in said chamber, a second charging chamber communicating with said heating chamber by a conduit, a door for said chamber, means permitting the discharge of molten charge from said furnace, and means for rocking said furnace to cause the circulation of molten charge through said charging chamber whereby portions of fresh charge are subjected to the washing of molten charge.

In witness whereof, I have hereunto set my hand this 8th day of January 1920.

EDGAR F. COLLINS.